United States Patent [19]
Garrido

[11] Patent Number: 5,941,494
[45] Date of Patent: Aug. 24, 1999

[54] INERTIAL LOCK ASSEMBLY FOR A SEAT TRACK

[75] Inventor: Pascal Garrido, Gravehurst, Canada

[73] Assignee: Meritor Automotive Canada Inc., Canada

[21] Appl. No.: 09/140,107

[22] Filed: Aug. 25, 1998

[51] Int. Cl.⁶ .................................................. F16M 13/00
[52] U.S. Cl. ...................................... 248/429; 297/216.18
[58] Field of Search .................................... 248/429, 430, 248/424, 419; 297/216.18; 296/68.1

[56] References Cited

U.S. PATENT DOCUMENTS

| | | | |
|---|---|---|---|
| 5,769,377 | 6/1998 | Gauger | 248/429 |
| 5,829,727 | 11/1998 | Chinomi et al. | 248/429 |
| 5,873,558 | 2/1999 | Sakamoto | 248/429 |

*Primary Examiner*—Ramon O. Ramirez

[57] ABSTRACT

A vehicle seat assembly includes a seat bottom and a seat back supported for movement relative to the seat bottom such that seat position can be adjusted forwardly or rearwardly with respect to the vehicle. A mounting assembly mounts the seat to a vehicle structure and includes a first track, a second track supported for movement relative to the first track with the seat bottom being supported on the second track for movement with the second track, and an actuator for selectively controlling the movement of the second track with respect to the first track. A locking assembly is moveable between a locked position where the locking assembly prevents relative movement between the first and second tracks and an unlocked position where the second track is movable relative to the first track. The locking assembly includes a rod, a retainer, and a nut. The rod defines a longitudinal axis of rotation and is fixed to the second track for movement therewith. The retainer is fixed to the first track, and the nut is supported on the rod for rotation about the axis and has at least one pawl member. The nut is rotated at a variable rate of rotation by the rod as the second track moves, and has a rotational force that varies with the rate of rotation such that the pawl engages the retainer to move the locking assembly into the locked position when the rotational force exceeds a pre-determined rotational force limit.

20 Claims, 3 Drawing Sheets

INERTIAL LOCK ASSEMBLY FOR A SEAT TRACK

BACKGROUND OF THE INVENTION

This application relates to a locking assembly that moves between an unlocked position allowing relative movement between two members and a locked position preventing movement between the members, and more particularly to a locking assembly having a nut with a pawl member moveable between the locked and unlocked positions dependent on rotational speed of the nut.

Locking assemblies are often used in seat assemblies for controlling movement between track members. Typically a first track member is fixed to a vehicle structure, such as a floor, and a second track member is supported on the first track member for movement relative to the first track member such that the seat position can be adjusted forwardly or rearwardly with respect to the vehicle. The adjustment of the seat assembly is controlled by either a mechanical actuator, an electrical actuator, or an electro-mechanical actuator. Locking assemblies are moved between an unlocked position where the second track is allowed to move relative to the first track and a locked position where the second track is prevented from moving with respect to the first track.

Locking assemblies typically are in the locked position to prevent movement between the seat tracks during normal operation of the vehicle. When a seat adjustment is required, the actuator moves the locking assembly to the unlocked position and the second track is allowed to move relative to the first track. When the seat is in the desired position, the locking assembly is returned to the locked position. If the vehicle experiences a sudden acceleration or deceleration while the seat position is being adjusted, the potential exists for the seat to move suddenly to the maximum forward position or the maximum rearward position, which is undesirable.

Thus, it is desirable to have a locking assembly that can be automatically actuated during seat adjustment to prevent extreme seat positioning changes if the vehicle experiences a sudden deceleration or acceleration. It is also desirable to have such a locking assembly that is durable and robust yet requires few parts so that assembly cost and overall assembly weight can be reduced.

SUMMARY OF THE INVENTION

In a disclosed embodiment, a locking assembly includes a first member, a second member supported for linear movement relative to the first member, a threaded rod, a retainer, and a nut in threaded engagement with the rod. The threaded rod defines a longitudinal axis of rotation and is fixed to the second member for movement therewith. As the rod and second member move in a linear direction, the nut is caused to rotate about the axis. Thus, the nut has a rotational speed that varies with a linear speed of the second member. The retainer receives the nut and is fixed to the first member. The nut has at least one pawl member that is moveable between an unlocked position where the nut is free to rotate on the rod, allowing the second member to move with respect to the first member, and a locked position where the pawl engages the retainer for preventing relative movement between the first and second members. The pawl is moved from the unlocked position to the locked position when the rotational speed exceeds a pre-determined rotational speed limit. The subject locking assembly provides a simplified assembly that is light-weight, durable, easily installed, easily maintained, and is inexpensive. These and other features can be understood from the following specification and drawings.

DETAILED DESCRIPTION OF THE PREFERRED EMBODIMENT

Figure 1:
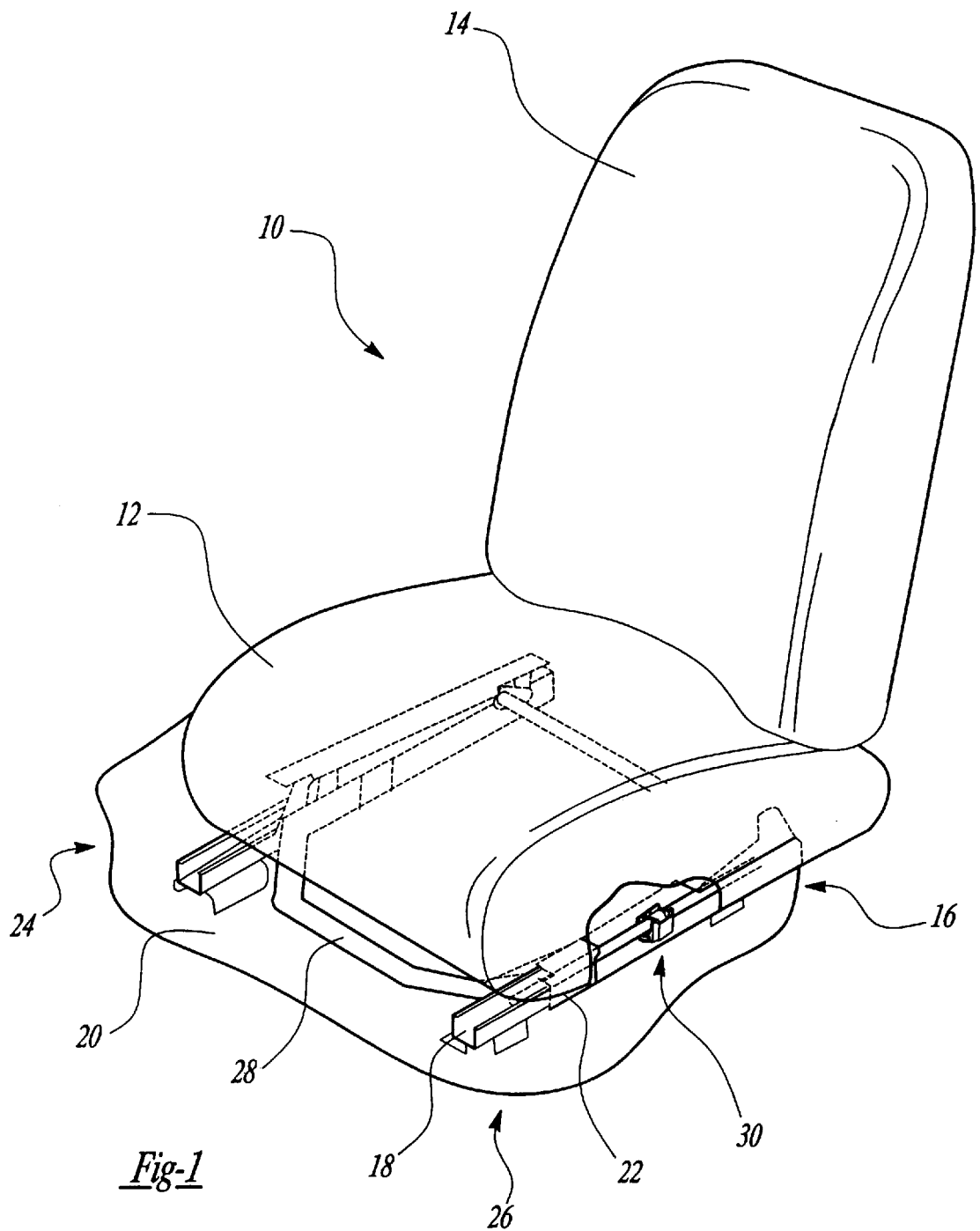
FIG. 1 is a perspective view of a seat assembly incorporating the inventive locking assembly.

A vehicle seat assembly is shown generally at 10 in FIG. 1. The seat assembly 10 includes a seat bottom 12 and a seat back 14 supported with respect to the seat bottom 12. A seat mounting assembly 16 is used to mount the seat assembly 10 to the vehicle and includes a first track 18 that is mounted to a vehicle structure 20, such as a floor, and s second track 22 that slides with respect to the lower track 18. The seat bottom 12 is supported on the second track 22 for movement with the second track 22 for seat adjustment in a forward or rearward position. Preferably, the first track 18 is a lower track and the second track 22 is an upper track, however, it should be noted that the terms forward, rearward, upper, and lower, as used in this description, are for illustration purposes only and cannot be considered limiting.

The mounting assembly 16 includes track assemblies on an inboard side 24 and an outboard side 26 of the seat assembly 10. An actuator 28 is used for selectively controlling the movement of the second track 22 with respect to the first track 18. The actuator 28 is preferably a handle or towel bar, accessible by a seat occupant, that is operably connected to both the inboard 24 and outboard 26 track assemblies. While a manual type seat actuator is shown, it should be understood that the subject invention could also be used in conjunction with an electrical seat adjuster assembly or an electro-mechanical seat adjuster assembly. Also, the terms inboard and outboard are used in this description for clarity and illustration purposes only and cannot be considered limiting.

The mounting assembly 16 includes a locking assembly 30 that is moveable between a locked position where the locking assembly 30 prevents relative movement between the first 18 and second 22 tracks and an unlocked position where the second track 22 is movable relative to the first track 18. The locking assembly 30 can be located on either the inboard 24 or outboard 26 track assembly, or a locking assembly 30 can be installed in both track assemblies.

Figure 2:
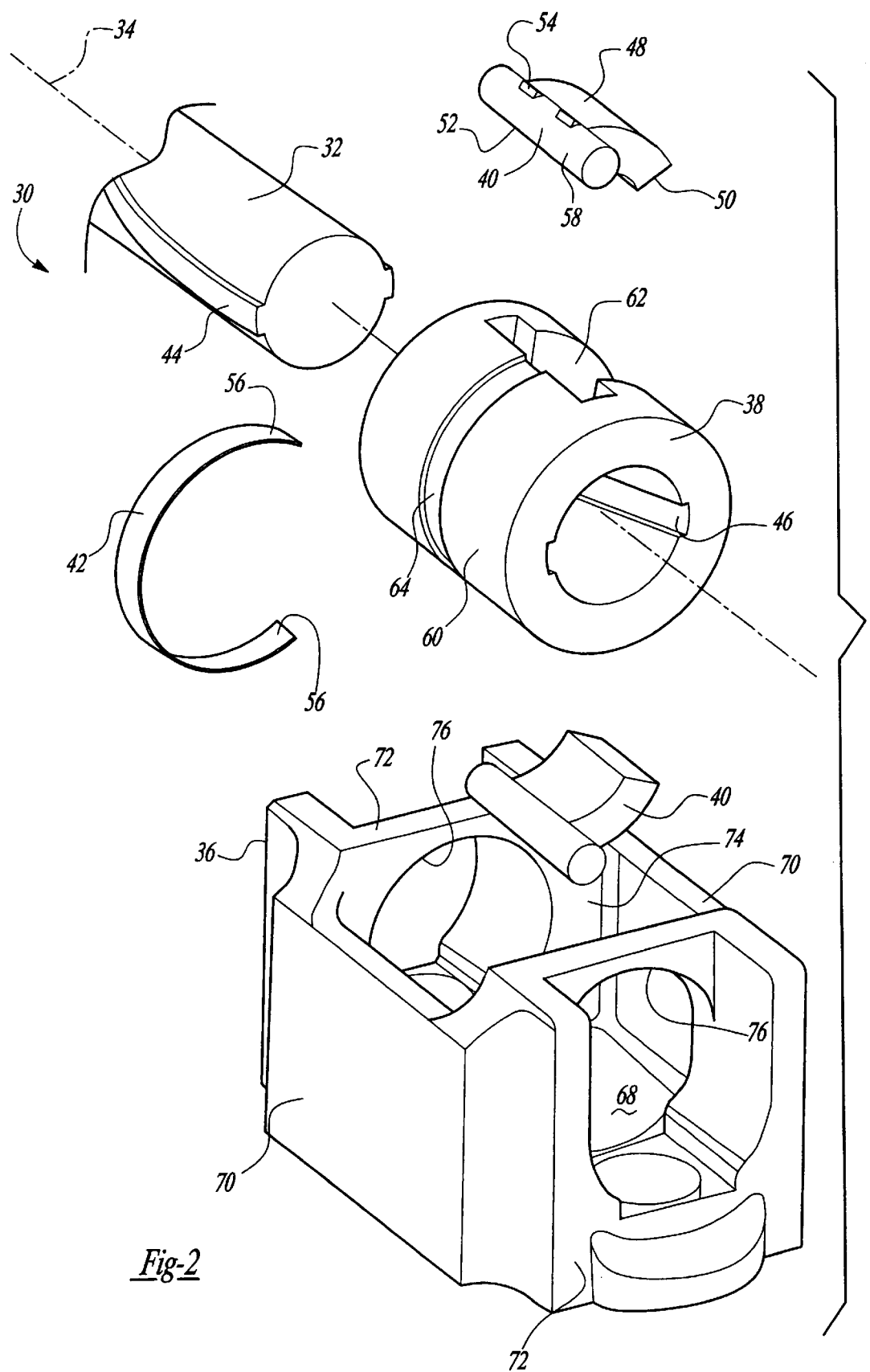
FIG. 2 is an exploded perspective view of the inventive locking assembly.

The locking assembly 30, shown in more detail in FIG. 2, includes a threaded rod 32 that defines a longitudinal axis of rotation 34 and which is fixed to the second 22 or upper track member for movement with the second track member 22. The locking assembly also includes a retainer 36 that is preferably fixed to the first 18 or lower track member. While the retainer 36 is preferably a separate piece that is fastened or attached to the first track 18 by methods well known in the art, the retainer 36 could also be integrally formed with the first track 18 as one piece.

A nut 38 is in threaded engagement with the rod 32 so that the nut 38 rotates about the axis 34 at a rotational speed that varies with the linear speed of the second track member 22.

Thus, as the second track 22 and rod 32 move, the nut is caused to rotate, which produces a rotational force. This rotational force varies with the linear speed of the rod 32. The rotational force is a centrifugal force that tends to impel a member outward from a center of rotation, i.e., it is a force that an object moving along a circular path exerts on the body constraining the object and that acts outwardly away from the center of rotation. The magnitude of the rotational force is proportional to the rate of rotation of the nut 38 about the rod 32. As the rate of rotation of the nut 38 about the rod 32 increases, the rotational force increases. Thus, if the vehicle experiences a sudden acceleration or deceleration and the rod is caused to move rapidly along the longitudinal axis 34, the rotational force created by the nut 32 will be higher than if the rod is moved under normal seat adjusting conditions. The rotational force of the nut 38 on the rod 32 will be discussed in greater detail below.

The nut 38 has at least one pawl member 40 that is moveable between an unlocked position where the nut 38 is free to rotate on the rod 32, allowing the second track 22 to move with respect to the first track 18, and a locked position where the pawl 40 engages the retainer 36 for preventing relative movement between the first 18 and second 22 tracks. The pawl 40 is comprised of a curved arm 48 having one end 50 pivotally supported by the nut 38 with an opposite end 52 movable between the unlocked and locked positions. The pawl 40 is moved from the unlocked position to the locked position when the rotational force created by the nut 38 rotating about the rod 32 exceeds a pre-determined rotational force limit.

When the rotational force exceeds the pre-determined limit, the arm 48, which is pivotally attached at one end 50, is caused to pivot outwardly from the nut 38 due to the centrifugal forces created by the rotation. When the arm 48 pivots outwardly, it engages the retainer 36 to prevent further rotation of the nut 38 about the rod 32. This prevents the upper track member 22 from further movement relative to the lower track member 18. The arm 48 preferably includes at least one extension 54 for grippingly engaging the retainer 36 when the pawl 40 is moved to the locked position.

The nut 38 is caused to rotate by the rod 32. When the actuator 28 is actuated to move the upper track 22 back and forth along the longitudinal axis 34, the rod 32 is also caused to move. The rod 32 has an exterior surface 44 that is preferably threaded and the nut 38 has an internal central bore 46 that is also preferably threaded. The rod 32 extends through the bore 46 such that the exterior threaded surface 44 of the rod 32 engages the threaded internal bore 46 of the nut 38. As the rod 32 is moved linearly by the second track 22, the nut 38 is caused to rotate about the rod 32.

The nut 38 is preferably cylindrical in shape and is non-self-locking. This means that the nut 38 is free to rotate along the entire length of the rod 32 and does not include an inherent locking action to tighten the nut 38 onto the rod 32 to prevent loosening. Thus, as the rod 32 moves back and forth along the longitudinal axis 34 the nut 38 is free to rotate.

As discussed above, the pawl 40 is moved from the unlocked position to the locked position when the rotational force created by the nut 38 rotating about the rod 32 exceeds a pre-determined rotational force limit, or when the rotational speed of the nut 38 exceeds a pre-determined speed limit. The pre-determined rotational speed and force limits are controlled by a resilient retaining member 42, which interacts with the pawl 40. The resilient retaining member 42 has a pre-determined retaining force for biasing the pawl 40 in the unlocked position. The pre-determined rotational force limit is reached when the rotational force of the pawl 40 overcomes the pre-determined retaining force.

The resilient retaining member 42 is preferably a C-shaped spring that partially surrounds the nut 38 and which has a pair of spring ends 56, however, other resilient retaining members known in the art could be used. One of the spring ends 56 interacts with the pawl 40 for biasing the pawl 40 in the unlocked position. When the rotational force or speed created by the nut 38 rotating about the rod 32 is high, such as when the vehicle experiences a sudden deceleration, the retaining force of the spring 42 is overcome and the pawl 40 is moved to the locked position.

In the preferred embodiment, the nut 38 includes two (2) pawls 40. The first pawl 40 moves between the unlocked and locked positions when the nut 38 is rotated in a first direction and the second pawl 40 moves between the unlocked and locked positions when the nut 38 is rotated in a second direction opposite from the first direction. Thus, the locking assembly 30 can be actuated if the rod 32 is being moved forwardly or rearwardly along the longitudinal axis 34. The pawls 40 are preferably located on opposite sides of the nut 38 with their pivotally supported ends 50 facing each other. This orientation of the pawls 50 allows the free end 52 of one of the pawls 40 to pivot outwardly when the rod 32 causes the nut 38 to rotate in the first direction and allows the free end 52 of the other pawl 40 to pivot outwardly when the rod 32 causes the nut 38 to rotate in the second direction.

The free end 52 of the pawl 40 includes a cross member 58 that extends transversely to the curved arm portion 48 of the pawl. The cross member 58 causes the free end 52 of the arm 48 to be weighted such that the arm 48 will not pivot outwardly until the rotational force is sufficient to overcome the weight of the cross member 58.

One of the ends 56 of the resilient retaining member 42 preferably interacts with one of the pawls 40 while the other end 56 of the retaining member 42 interacts with the other pawl 40. The ends 56 resiliently bias the pawls 40 to be in the unlocked position. Thus, if the nut 38 is rotating in a first direction and the rotational force exceeds the resilient retaining force, the respective pawl 40 will pivot outwardly to engage the retainer 36 and prevent further movement between the tracks 18, 22.

The nut 38 preferably has an exterior surface 60 with pawl recesses 62 for partially receiving the pawls 40. A spring recess 64 extends from the first pawl recess to the second pawl recess 62. The spring-type resilient retaining member 42 is received in the spring recess 64. Locating the pawls 40 in the pawl recesses 62 and the retaining member 42 in the spring recess 64 allows the nut 38 to rotate freely with in the retainer 36 while the position of the seat is being adjusted under normal operating conditions.

The retainer 36 includes a generally rectangular bottom 68, a pair of sidewalls 70 extending upwardly from the bottom 68, and a pair of end walls 72 extending upwardly from the bottom 68 and interconnecting the sidewalls 70. The bottom 68, sidewalls 70, and endwalls 72 define a central pocket 74 for receiving the nut 38.

As previously mentioned, the nut 38 has an internal cylindrical bore 46 extending therethrough. Each of the endwalls 72 includes a center hole 76 that is aligned with the bore 46 in the nut 38. The rod 32 moves along the longitudinal axis 34, through the cylindrical bore 46, and through the central holes 76 as the second track 22 moves.

Figure 3:
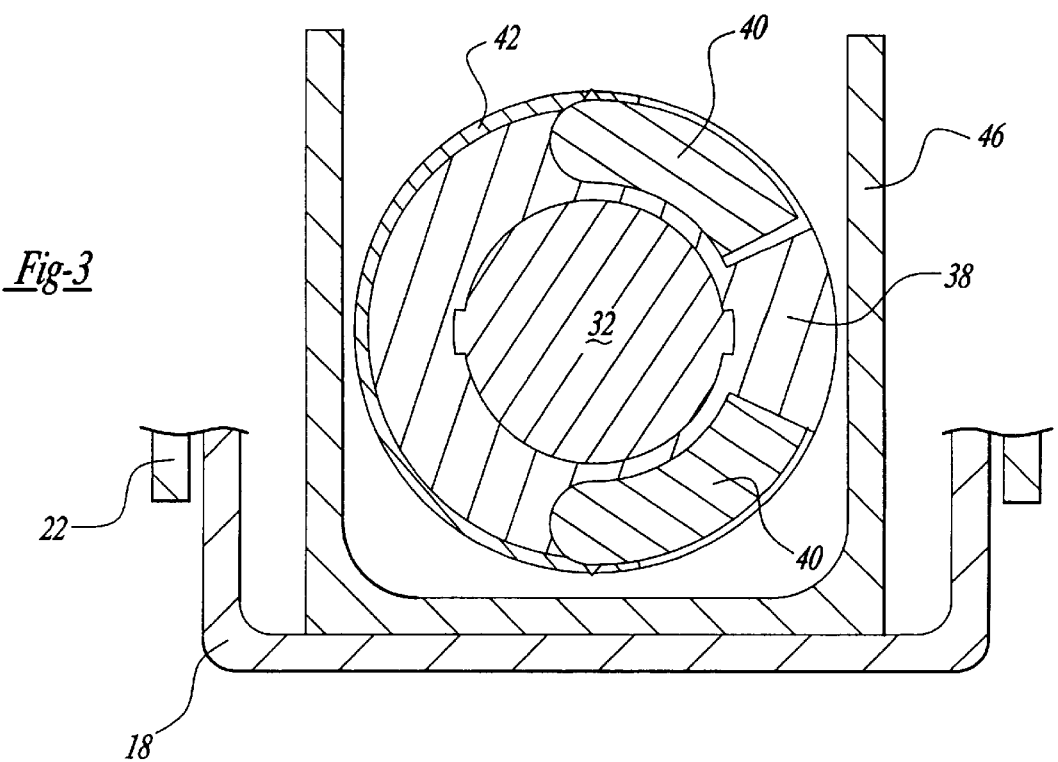
FIG. 3 is a cross-sectional view of the locking assembly in the unlocked position.

In operation, when the seat is being adjusted, the rod 32 is moved along with the upper track while the lower track 18 and retainer 36 remain in a fixed position. As the rod 32 is moved, it causes the nut 38 to rotate freely. During normal operation, as the seat is adjusted to a desired position, the pawls remain in the unlocked position shown in FIG. 3.

Figure 4:
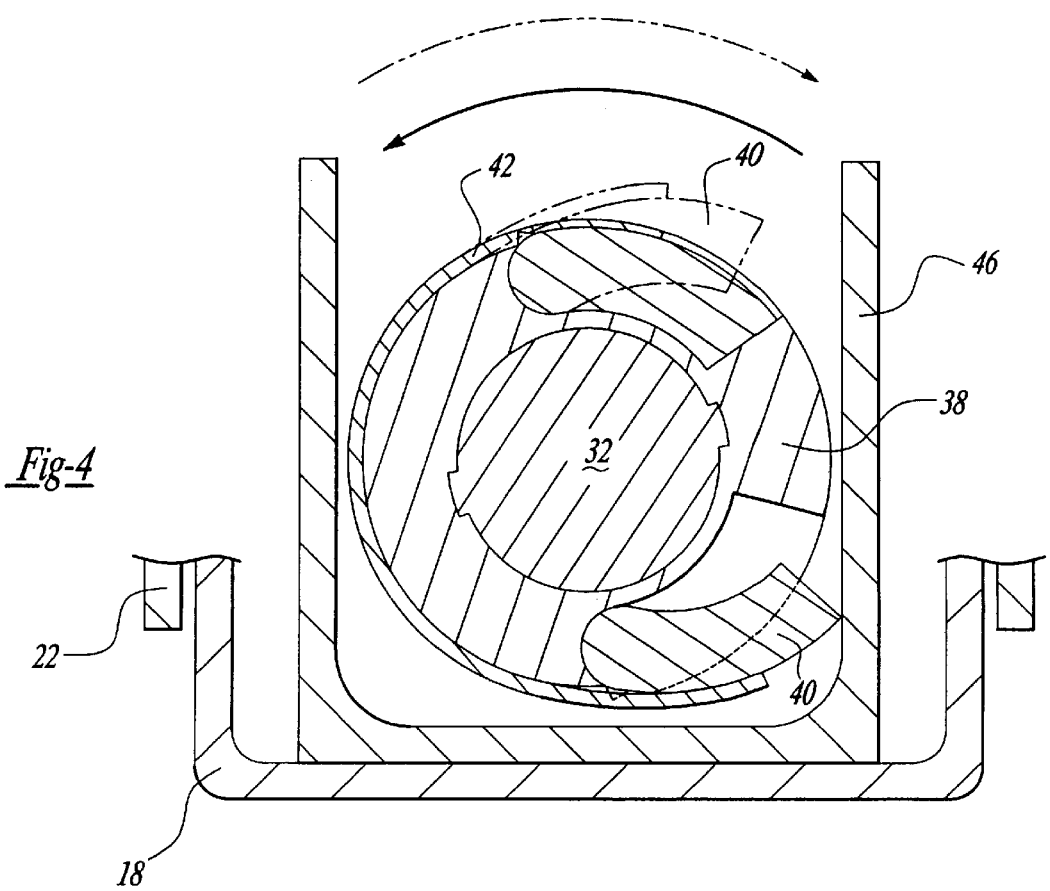
FIG. 4 is a cross-sectional view of the locking assembly in the locked position.

If the vehicle experiences a sudden deceleration or acceleration, and the nut is caused to rotate at an excessive rotational speed, the pawl 40 is will be moved from the unlocked position to the locked position shown in FIG. 4. The pawl 40 is moved into the locked position when the rotational force created by the nut 38 rotating about the rod 32 overcomes the resilient retaining force that biases the pawl 40 in the unlocked position. When the pawl moves to the locked position, it pivots outwardly from the nut and engages the retainer 36. The extension 54 that extends outwardly from the pawl 40 grippingly engages the retainer 36 to prevent further movement between the upper 22 and lower 18 tracks.

It should be noted that the locking assembly 30 can be used in conjunction with seat adjusters that include their own internal locking mechanisms. In such a configuration, the subject locking assembly would be a secondary locking mechanism to prevent sudden or unexpected seat position changes when the vehicle experiences a sudden acceleration or deceleration. This secondary locking mechanism would be automatically actuated under appropriate conditions even if the seat was in the process of being adjusted.

Preferred embodiments of this invention have been disclosed, however, a worker of ordinary skill in the art would recognize that certain modifications would come within the scope of this invention. For that reason the following claims should be studied to determine the true scope and content of this invention.

We claim:

1. A locking assembly comprising
   a first member;
   a second member supported for movement relative to said first member;
   a threaded rod defining a longitudinal axis of rotation and fixed to said second member for movement therewith;
   a retainer fixed to said first member; and
   a nut, in threaded engagement with said rod, for rotation about said axis and having a rotational force that varies with a rate of rotation of said nut on said rod, said nut having at least one pawl member that is moveable between an unlocked position where said nut is free to rotate on said rod, allowing said second member to move with respect to said first member, and a locked position where said pawl engages said retainer for preventing relative movement between said first and second members wherein said pawl is moved from said unlocked position to said locked position when said rotational force exceeds a pre-determined rotational force limit.

2. An assembly as recited in claim 1 including an actuator for moving said second member and said rod along said longitudinal axis wherein said nut rotates about said rod as said rod moves.

3. An assembly as recited in claim 1 including a resilient retaining member having a pre-determined retaining force for biasing said pawl in said unlocked position.

4. An assembly as recited in claim 3 wherein said pre-determined rotational force limit is reached when said rotational force of said pawl overcomes said pre-determined retaining force.

5. An assembly as recited in claim 4 wherein said resilient retaining member is a spring partially surrounding said nut and having a pair of spring ends wherein one of said spring ends interacts with said pawl for biasing said pawl in the unlocked position.

6. An assembly as recited in claim 1 wherein at least one pawl is comprised of a first pawl and a second pawl, said first pawl moving between said unlocked and locked positions when said nut is rotated in a first direction and said second pawl moving between said unlocked and locked positions when said nut is rotated in a second direction opposite from said first direction.

7. An assembly as recited in claim 1 wherein said nut is generally cylindrical in shape and has a recess for partially receiving said pawl.

8. An assembly as recited in claim 7 wherein said pawl is a curved arm having one end pivotally supported by said nut with an opposite end movable between said unlocked and locked positions.

9. An assembly as recited in claim 8 wherein said arm includes at least one extension for grippingly engaging said retainer when said pawl is moved to said locked position.

10. An assembly as recited in claim 1 wherein said retainer includes a generally rectangular bottom, a pair of sidewalls extending upwardly from said bottom, and a pair of end walls extending upwardly from said bottom and interconnecting said sidewalls wherein said bottom, sidewalls, and endwalls define a central pocket for receiving said nut.

11. An assembly as recited in claim 10 wherein said nut has a cylindrical bore extending therethrough and each of said endwalls includes a center hole, said rod moving along said longitudinal axis through said cylindrical bore and said central holes as said second track moves.

12. An assembly for mounting a seat within a vehicle comprising:
    a first track;
    a second track supported for movement relative to said first track;
    an actuator for selectively controlling the movement of said second track with respect to said first track; and
    a locking assembly moveable between a locked position where said locking assembly prevents relative movement between said first and second tracks and an unlocked position where said second track is movable relative to said first track, said locking assembly including a rod defining a longitudinal axis of rotation and fixed to said second track for movement therewith, a retainer fixed to said first track, and a nut supported on said rod for rotation about said axis and having at least one pawl member, wherein said nut is rotated at a variable rate of rotation by said rod when said second track moves, said nut having a rotational force that varies with said rate of rotation such that said pawl engages said retainer to move said locking assembly into said locked position when said rotational force exceeds a pre-determined rotational force limit.

13. An assembly as recited in claim 12 wherein said nut includes a threaded central bore and said rod has a threaded exterior surface received in said bore such that as said actuator moves said rod in a linear direction with respect to said first track said nut rotates about said rod.

14. An assembly as recited in claim 13 wherein said nut is non-self-locking.

15. An assembly as recited in claim 12 including a resilient retaining member for biasing said pawl in said unlocked position.

16. An assembly as recited in claim 15 wherein said nut is generally cylindrical and has an exterior surface with a recess for receiving said resilient retaining member.

17. An assembly as recited in claim 16 wherein said resilient retaining member is comprised of a spring that partially surrounds said nut and partially engages said pawl.

18. A vehicle seat assembly comprising a seat bottom;

a seat back supported relative to said seat bottom;

a first track;

a second track supported for movement relative to said first track, said seat bottom being supported on said second track for movement with said second track;

an actuator for selectively controlling the movement of said second track with respect to said first track; and a locking assembly having a rod defining a longitudinal axis and being fixed to said second track for movement therewith, a retainer on said first track, and a nut rotatably supported on said rod such that as said second track moves, said rod moves with said second track along said longitudinal axis causing said nut to rotate at a rotational speed, said nut including at least one pawl moveable between an unlocked position where said second track moves relative to said first track and an locked position where said second track is prevented from moving with respect to said first track wherein said pawl is moved from the unlocked position to the locked position when said rotational speed exceeds a pre-determined limit.

19. An assembly as recited in claim 18 wherein said at least one pawl is comprised of a plurality of pawls with a first pawl moving between said unlocked and locked positions when said nut is rotated in a first direction and a second pawl moving between said unlocked and locked positions when said nut is rotated in a second direction opposite from said first direction.

20. An assembly as recited in claim 19 including a resilient retaining member for biasing said first and second pawls in said unlocked position.

\* \* \* \* \*